Figure 1:
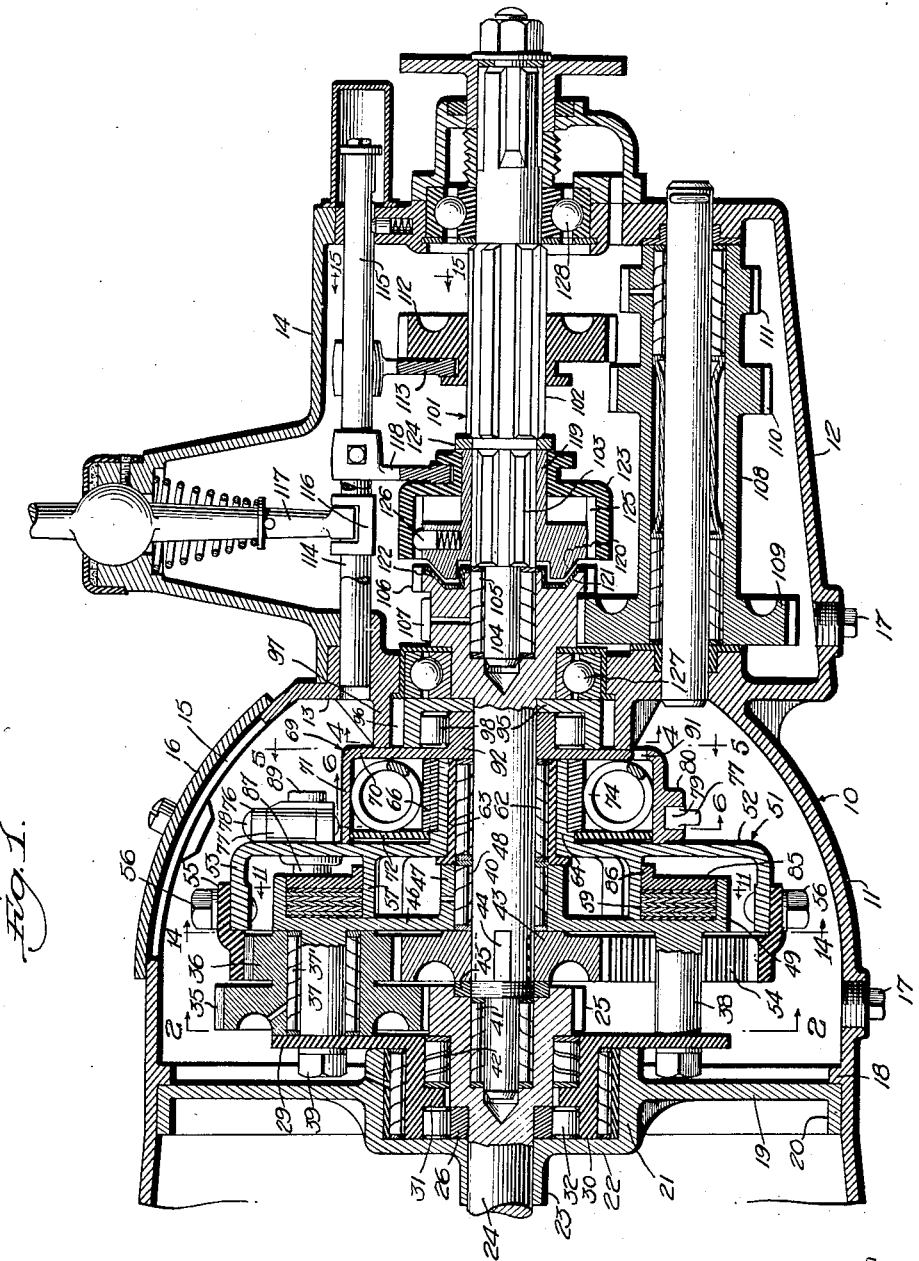

Sept. 4, 1934.  F. C. REYNOLDS  1,972,107
AUTOMATIC POWER TRANSMISSION
Filed April 26, 1933  4 Sheets-Sheet 1

Inventor
FRANK C. REYNOLDS

By C. L. Parker, Jr.
Attorney

Sept. 4, 1934.  F. C. REYNOLDS  1,972,107
AUTOMATIC POWER TRANSMISSION
Filed April 26, 1933   4 Sheets-Sheet 2

Inventor
FRANK C. REYNOLDS
C. L. Parker Jr.
Attorney

Sept. 4, 1934.  F. C. REYNOLDS  1,972,107
AUTOMATIC POWER TRANSMISSION
Filed April 26, 1933   4 Sheets-Sheet 3
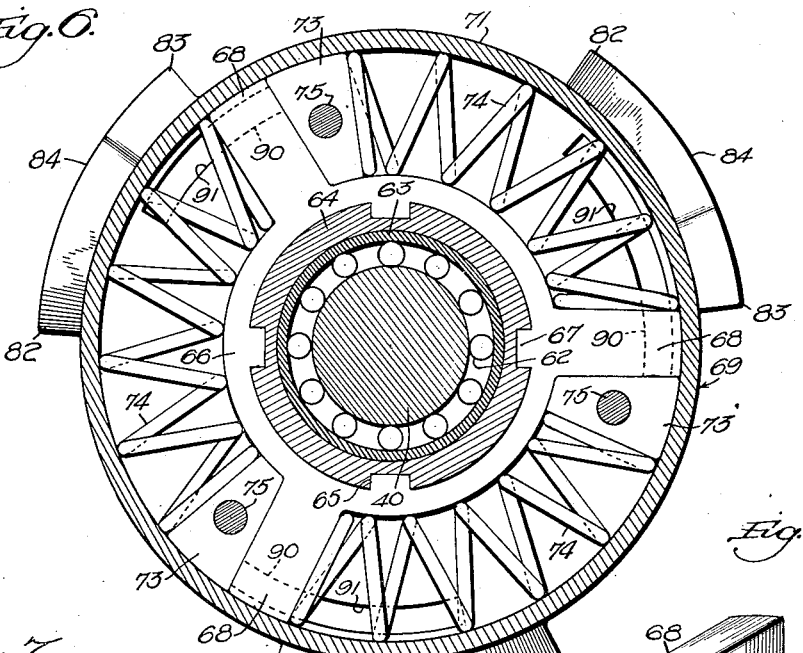
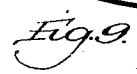
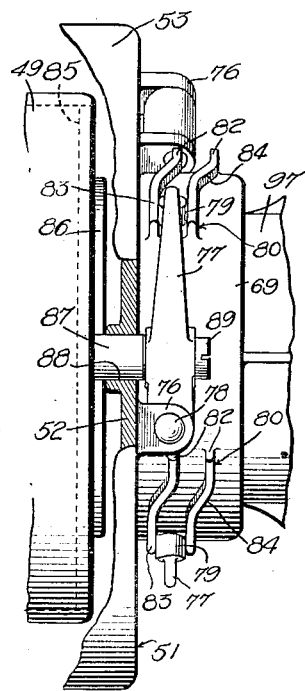
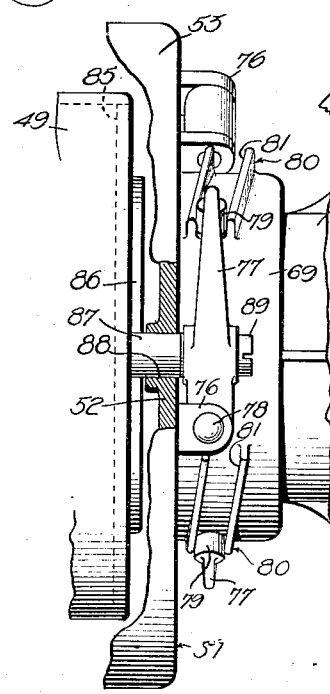
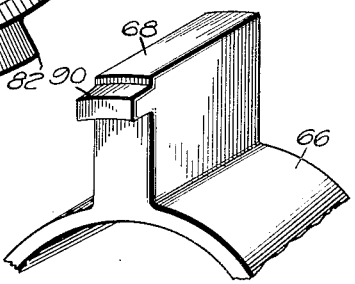
Inventor
FRANK C. REYNOLDS

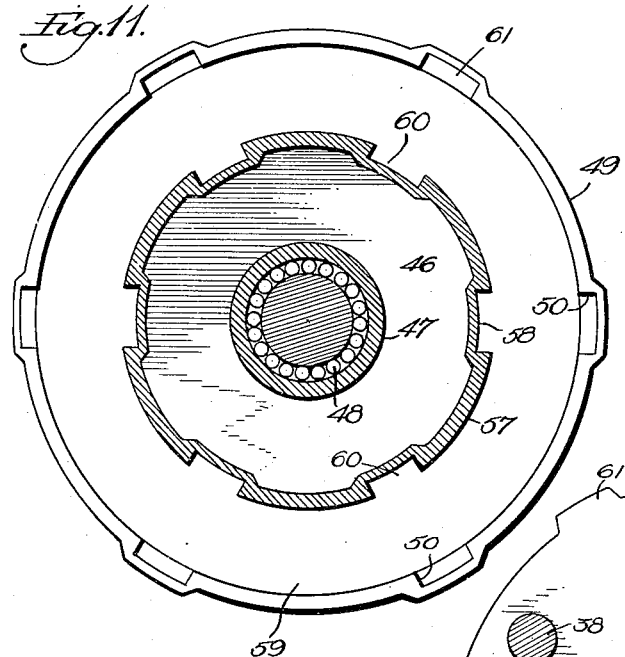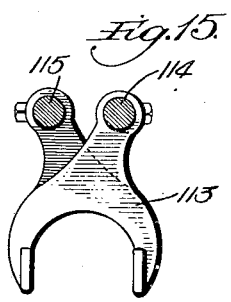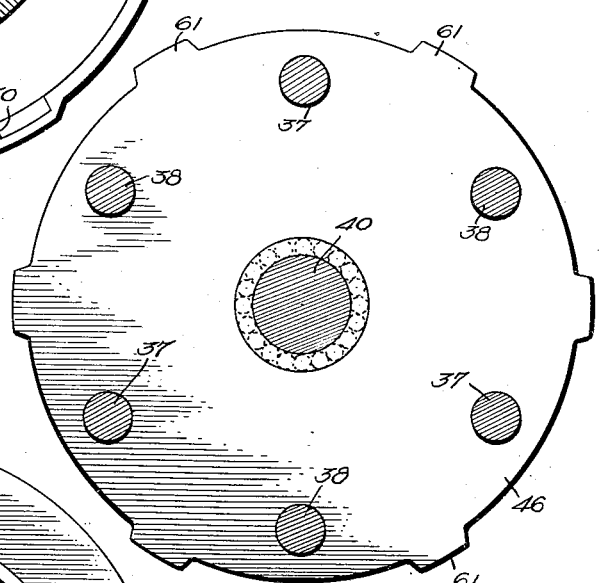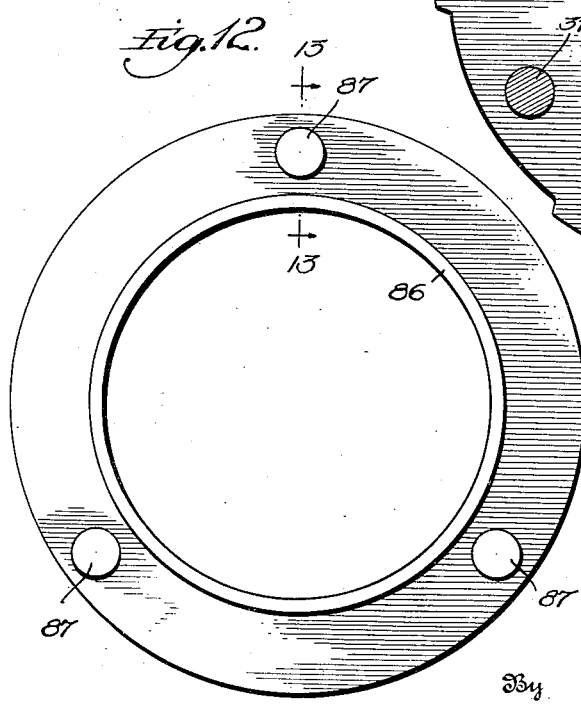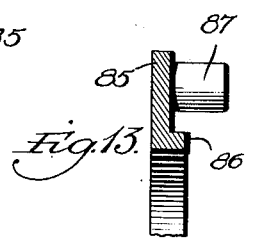

Patented Sept. 4, 1934

1,972,107

UNITED STATES PATENT OFFICE 1,972,107

AUTOMATIC POWER TRANSMISSION

Frank C. Reynolds, Columbus, Ohio

Application April 26, 1933, Serial No. 668,125

14 Claims. (Cl. 74—34)

This invention relates to automatic power transmissions, and more particularly to an automatic transmission for motor vehicles.

The provision of transmission means for motor vehicles by means of which variations in engine and traction torque can be utilized for providing desired driving ratios has long been considered an outstanding automotive problem. Such a transmission would overcome the remaining defects in the conventional change speed gearing which, at the present time, is believed to be perfected substantially to its limit in view of its inherent undesirable characteristics. The most satisfactory feature of conventional transmissions is the direct drive in high gear, and when operating in high gear, such a transmission leaves little to be desired. Practically all of the formerly objectionable transmission noises have been eliminated, and the necessity for skill in gear shifting has been largely eliminated through the development of means for synchronizing the gears when shifting.

Such conventional transmission, however, still possesses several disadvantageous features, and since such features are inherent in the construction, they cannot be eliminated. For example, the desirability or necessity for shifting gears under varied conditions is a matter determined by the judgment of individual drivers. It is well known that motorists demand the utmost in what is commonly termed performance in their motor vehicles. In other words, they demand a motor capable of rapid acceleration, and a motor which is capable of driving the vehicle in high gear over practically all grades, and they refuse to be inconvenienced by frequent gear shifting. A great majority of drivers will not shift gears when climbing steep grades until the motor reaches almost the stalling point, and most cars when climbing steep hills operate inefficiently for the reason that the motor speed drops substantially below its most efficient speed of operation. To meet the demands of the motoring public, the manufacturers accordingly are forced to power motor vehicles with motors developing power far beyond the normal or average requirements in order that ample reserve power may be present to satisfy the demands of the users. The result is that a great surplus of power is present when driving on level roads, and maximum vehicle speeds are attained far above speeds corresponding to maximum motor power, consequently resulting in a substantial loss of power.

Vehicle transmissions of the conventional type possess the additional disadvantage of causing an interruption of driving torque when shifting gears. As is well known, this operation must be accomplished within the judgment and skill of the operator through the disengagement of the clutch, and shifting of the gears and reengagement of the clutch, and the driving torque is thus interrupted for an appreciable period at each gear shifting operation which is highly disadvantageous, particularly when climbing grades.

A further disadvantage of conventional engine and transmission construction lies in the fact that the serious destructive force of vibration is always present, and much of this vibration is due to the action of the motor in delivering rotating and reciprocating shocks which are taken up in conventional constructions by the shafts, bearings and gears.

An important object of the present invention is to provide a vehicle transmission which affords a change of gear ratio automatically by torque reaction.

A further object is to provide a transmission which provides variations in gear ratio by torque reaction in two directions, namely, by the pull of the engine when the vehicle is being propelled, and by the momentum of the vehicle when the engine is operating as a brake.

A further object is to provide a transmission of the character referred to wherein gear ratios are changed automatically without any interruption whatever in the delivery of driving force to the traction wheels.

A further object is to provide a transmission which possesses a substantial degree of inherent flexibility to absorb torsional vibration and thus minimize the destructive force of such vibration on the gears, pinions and bearings.

A further object is to provide a transmission which does not depend on the skill of the driver under any conditions, and which affords quick driving engagement without shock to the transmission or any other part of the vehicle.

A further object is to provide a transmission of the type referred to which automatically affords the proper driving ratio, thus permitting the engine to operate at more efficient speeds in accordance with varying torque conditions whereby smaller engines may be used with substantial economy and efficiency in operation.

A further object is to provide a transmission which increases the flexibility of the engine and prevents engine stalling.

A further object is to provide a transmission which effects a continuous saving in fuel and oil due to the use of a smaller engine operating at more efficient speeds.

A further object is to provide a transmission which automatically permits quicker acceleration and deceleration and which simplifies car control.

A further object is to provide a transmission of the automatic character referred to which affords more silent gear operation and in which all motion is rotational to provide increased balance.

A further object is to provide a transmission which operates to decrease brake and clutch operation.

A further object is to provide an automatic transmission which permits the accomplishment of maximum gear speeds substantially at maximum engine speeds.

Other objects and advantages of the invention will become apparent during the course of the following description.

Figure 3:
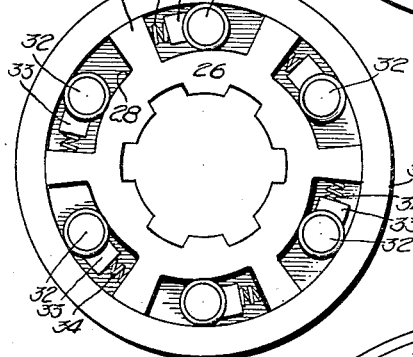
Figure 4:
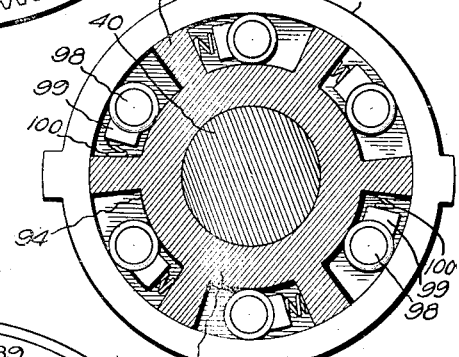
Figure 5:
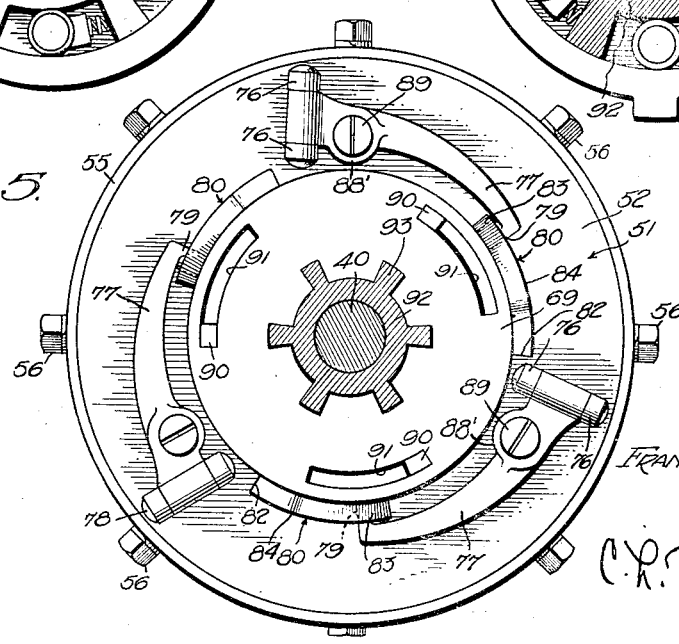

In the drawings I have shown one main embodiment of the invention. In this showing, Figure 1 is a central vertical longitudinal sectional view, Figure 2 is a vertical transverse section on line 2—2 of Figure 1, Figure 3 is a face view of an overrunning clutch at the forward end of the transmission, Figure 4 is a section of another overrunning clutch taken substantially on line 4—4 of Figure 1, the casing being omitted, Figure 5 is a section on line 5—5 of Figure 1, Figure 6 is a similar view on line 6—6 of Figure 1, Figure 7 is a side elevation of a portion of the clutch operating mechanism, parts being shown in section and parts being broken away, Figure 8 is an enlarged detail sectional view of a clutch operating lever and associated elements, parts being broken away and parts being shown in section, Figure 9 is a view similar to Figure 7 showing a somewhat modified form of clutch control means, Figure 10 is a fragmentary detail perspective view of a portion of the torque reaction device, Figure 11 is a section on line 11—11 of Figure 1, Figure 12 is a face view of the clutch pressure plate, Figure 13 is an enlarged detail sectional view on line 13—13 of Figure 12, Figure 14 is a section on line 14—14 of Figure 1, the ring gear member and associated parts being omitted, and, Figure 15 is a detail sectional view on line 15—15 of Figure 1.

Referring to Figure 1, the numeral 10 designates a transmission housing as a whole comprising preferably integral forward and rear sections 11 and 12 respectively divided by a vertical wall 13. The top of the rear section 12 is formed as a separate cover plate 14, while the forward housing section 11 is provided with an opening 15 covered by a plate 16. The housing sections are preferably provided with drain plugs 17, as shown. Adjacent its forward end, the housing section 11 is preferably substantially cylindrical and is provided with an internal annular flange 18 against which a circular plate 19 is seated. This plate is provided with an outer cylindrical flange 20 secured to the transmission housing in any suitable manner. The plate 19 is provided with a cylindrical hub portion 21 closed at its forward end as at 22, and the forward portion 22 of the plate 19 is provided with a forwardly projecting hub or sleeve 23.

A motor or driving shaft 24 projects rearwardly through the hub 23 and has its rear end provided with a driving pinion 25. A ring 26 is keyed or otherwise secured to the shaft 24 adjacent the wall 22 and is provided with a plurality of radial lugs 27. Between the adjacent pairs of lugs 27, the outer surface of the ring is provided with cam faces 28 for a purpose to be described. A rotating plate 29 is arranged within the forward housing and is provided with an annular flange portion 30 having its forward end arranged outwardly of the ring 26. The flange 30 is provided with an internal radial flange 31, as shown in Figure 1. Rollers 32 are arranged in the spaces between the radial lugs 27. A shoe 33 engages each roller and is urged in one direction by a spring 34 to tend to move the rollers 32 toward the high points of the cam surfaces 28. In this connection, it will be noted that the ring 26 is free to rotate in a clockwise direction as viewed in Figure 3, and the plate 29 and its flange 30 are similarly free to rotate in a counter-clockwise direction with relation to the ring 26. Accordingly it will be obvious that if the flange 30 rotates in a clockwise direction faster than the clockwise rotation of the ring 26, the rollers 32 will move toward the high points of the cams 28 to lock the elements together for simultaneous rotation.

Figure 2:
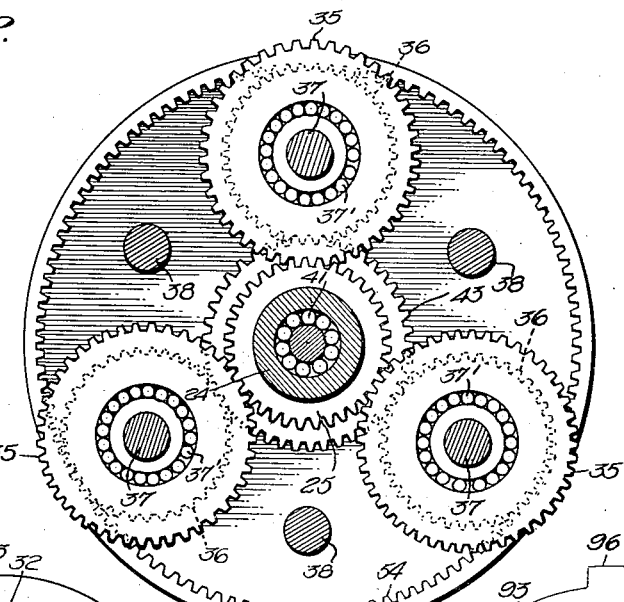

A plurality of planetary gears 35 surround the driving pinion 25 and mesh therewith as shown in Figure 2. Each of the gears 35 is preferably formed integral with a second planetary gear or pinion 36 for a purpose to be described. Each pair of planetary gears 35 and 36 is rotatable on a spindle or stub shaft 37, and roller bearings 37' are preferably arranged around the spindles. The spindles 37 are identical with a plurality of additional spindles 38, equidistantly spaced between the spindles 37, and both sets of spindles have their outer ends reduced and extending through the plate 29. Nuts 39 are threaded on the ends of the spindles to secure them to the plate 29. The purpose of the additional set of spindles 38 will be referred to later.

A driven shaft 40 is arranged rearwardly of and in axial alinement with the shaft 24. The forward end of the shaft 40 projects into the rear end of the shaft 24 and is rotatably supported by suitable pilot bearings 41. The rear end of the drive shaft is supported in suitable roller bearings 42 arranged within the flange 30 adjacent the internal flange 31. Rearwardly of the driving shaft 24, the shaft 40 is provided with a driving gear 43 keyed thereto as at 44 and meshing with the planetary pinions 36. The gear 43 is retained on the driven shaft by a threaded washer 45.

A plate 46 is arranged rearwardly of the pinions 36 and 43, and the spindles 37 and 38 are preferably formed integral with the plate 46. Accordingly the plates 29 and 46 form supporting means for the planetary gears, and the shafts 37 and 38 are effectively supported at both ends. The additional spindles 38 form additional rigid connections between the plates 29 and 46, and since the two spindles are identical, the planetary pinions may be changed to the spindles 38 if the spindles 37 become worn. The plate 46 is provided with a hub portion 47, and roller bearings 48 are arranged within this hub. Adjacent its outer edge, the plate 46 is provided with a rearwardly extending substantially annular flange 49 having spaced recesses 50 formed therein for a purpose to be described.

A housing 51 is arranged rearwardly of the plate 46 and includes a radial plate portion 52 and a cylindrical outer flange 53. An internal ring gear 54 has its teeth meshing with the pinions 36 and is provided with a rearwardly extending annular flange 55 surrounding the flange 53 and secured thereto by bolts 56.

The housing 51 is provided with an annular flange 57 formed integral with the plate portion 52 of the housing and arranged concentric to the flange 49. The flange 57 is formed in its outer face with a plurality of spaced recesses 58 similar to the recesses 50. A plurality of clutch plates 59 is arranged between the flanges 49 and 57. Alternate clutch plates are provided with internal and external bosses 60 and 61 arranged within the recesses 58 and 50 respectively. Automatic means is provided for exerting pressure against or releasing the pressure from the clutch plates, and such automatic means will be referred to later.

A set of roller bearings 62 surrounds the shaft 40 rearwardly of the bearings 48. A bushing 63 surrounds the bearings 62, as shown in Figure 1, and the housing 51 is provided with an annular hub portion 64 surrounding and secured to the bushing 63. The hub 64 is provided in its outer surface with a plurality of key slots 65. A ring or collar 66 surrounds the hub 64 and is provided with a plurality of preferably integral keys 67 arranged in the slots 65 to lock the ring 66 against rotation with respect to the hub 64. The ring 66 is provided with a plurality of outstanding radial lugs 68 for a purpose to be described.

A housing 69 surrounds the ring 66 as shown in Figures 1 and 6. The housing 69 includes a radial wall portion 70 and an outer substantially cylindrical flange portion 71. The forward end of the housing 69 is closed by a plate 72. The housing 69 is provided with preferably integral lugs 73 corresponding in number and arrangement to and normally arranged against the lugs 68. The sets of lugs are normally urged toward each other by arcuate coil springs 74. The lugs 73 are provided with threaded openings to receive screws 75 by means of which the plate 72 is secured in position.

Pairs of ears 76 are preferably cast integral with the radial wall 52 of the housing 51, as shown in Figure 7. A lever 77 has one end arranged between each pair of ears 76 and pivotally connected thereto as at 78. Each lever 77 is provided at its other end with an inwardly extending substantially radial boss 79. Each boss is arranged between a pair of trackways 80 preferably cast integral with the annular wall 71 of the housing 69, as shown in Figures 1, 5 and 7. These trackways are generally inclined with respect to a plane at right angles to the axis of the driven shaft 40, and may be in the form indicated by the numeral 81 in Figure 9. It is preferred however, that the trackways be constructed to form cams of the general shape indicated in Figure 7. Under such conditions the trackways would have straight offset parallel ends 82 and 83 connected by central cam portions 84. The purpose of the arrangement of the cams or trackways 80 in the form indicated in Figure 7 will be referred to later.

Referring to Figures 1, 12 and 13, the numeral 85 indicates a clutch pressure plate contacting with the rearmost clutch plate 59 and provided with an inner cylindrical flange 86 surrounding the flange 57. The purpose of the flange 86 is to guide the pressure plate 85 for true axial movement forwardly and rearwardly. At spaced points, the clutch plate is provided with preferably integral circumferentially spaced pins 87 which extend rearwardly through openings 88 formed in the wall 52 of the housing 51. Each lever 77 is provided with an enlarged portion 88' adjacent its pivoted end, and a screw 89 is threaded through the lever at such point. Any suitable means (not shown) may be employed for locking each screw 89 in selected positions. Each of the screws 89 has its inner end adapted to contact with the rear end of one of the pressure plate pins 87, as shown in Figure 8.

It will be apparent that relative rotation between the housings 51 and 69 in a manner to be referred to causes the lugs 79 of the clutch operating levers 77 to swing about their pivots 78, thus exerting pressure upon or releasing pressure from the pins 87. Such relative movement takes place against or under the influence of the springs 74 within the housing 69. It is preferred that relative movement of the ring 66 and housing 69 be limited, and accordingly each lug 68 is provided with a small rearwardly extending lug 90 operating in an arcuate slot 91 formed in the wall 70.

The wall 70 of the housing 69 is provided with a hub portion 92 surrounding the driven shaft 40 (see Figures 1 and 4). The hub 92 is provided with a plurality of outstanding substantially radial lugs 93. Between the lugs 93, the hub 92 is provided with eccentric cam faces 94. The lugs 93 are surrounded by an annular sleeve 95 having preferably integral radial keys 96 to secure the sleeve 95 to an annular flange 97 formed integral with the gear housing. A roller 98 is arranged between each adjacent pair of lugs 93 and is engaged by a shoe 99 urged in one direction by a spring 100.

The portion of the apparatus previously described is operative automatically to provide variable ratio power transmission under varying normal conditions. In other words, the clutch is operative in the manner to be described to start the vehicle from a standstill in an intermediate speed ratio, while all of the parts rotate automatically as a unit at a higher speed ratio corresponding substantially to the present high gear according to conventional practice. The portions of the apparatus in the rear housing section 12 are largely conventional as will become apparent, and it is merely necessary to perform one manual operation when starting the vehicle. Ordinarily it is unnecessary to make any further manual manipulations except when the vehicle is stopped. The apparatus of the rear housing section also is operative for providing lower forward speeds than are provided for in the normal operation of the elements previously described, and for providing reverse movement of the vehicle.

Referring to Figure 1, the numeral 101 designates a transmission shaft as a whole having an intermediate fluted portion 102 and a forward similar portion 103 of somewhat smaller diameter for a purpose to be described. The forward end of the shaft 101 is reduced as at 104 and is journaled in a pilot bearing 105 formed in the rear end of the driven shaft 40. The rear extremity of the shaft 40 is provided with positive clutch teeth 106, and a gear 107 is disposed forwardly of the clutch teeth.

Portions of the mechanism arranged in the rear casing section 12 are conventional and need not be referred to in detail. For example, a counter shaft 108 is arranged in the bottom of the housing and is provided with a forward gear 109 meshing with the gear 107 and two gears 110 and 111 are arranged toward the rear end of the counter shaft. The gear 110 is operative when it is desired to provide lower speeds than are normally provided with the forward transmission means, while the gear or pinion 111 meshes with a pinion on a conventional reverse gear shaft (not shown).

A gear 112 is splined on the portion 102 of the transmission shaft 101 and is slidable into mesh either with the gear 110 or a conventional gear on the reverse gear shaft in accordance with standard practice. Movement is transmitted to the gear 112 by an operating fork 113 secured to a shift rod 114. A second shift rod 115 is mounted parallel to the rod 114, and both rods are provided with the usual cut out members 116 engageable by the lower end of a gear shift lever 117 of conventional construction and operation. A shift fork 118 also is carried by the shift rod 115 for a purpose to be described.

A sleeve 119 is splined to the portion 103 of the transmission shaft and is provided at its forward end with a conical head 120 engageable in a conical recess 121 formed in the rear end of the shaft 40 inwardly of the clutch elements 106. The recess 121 is preferably provided with a bronze liner 122. The head 120 and recess 121 form a synchronizing clutch for a purpose to be described.

A drum 123 surrounds the sleeve 119 and has its rear end slidable thereon and engageable by the fork 118. The rear extremity of the drum 123 engages a thrust washer 124 mounted on the transmission shaft and engaging the forward end of the portion 102 thereof. The forward portion 103 of the transmission shaft is reduced in size whereby the forward end of the portion 102 forms a shoulder against which the washer 124 seats. The interior of the drum 123 is provided with longitudinal grooves 125 engaged by spring pressed poppets 126 carried by the sleeve 119. The frictional engagement between the poppets 126 and the grooves 125 is such that forward movement of the drum 123 will effect forward movement of the sleeve 119 to bring the synchronizing clutch elements into engagement.

The transmission shaft assembly is adequately supported in suitable forward and rear anti-friction bearings 127 and 128. The bearing 127 supports the rear end of the shaft 42, while the forward end of the transmission shaft 101 is supported in the pilot bearing 105. The rear bearing 128 is arranged in the rear end of the housing section 12 and supports the rear end portion of the transmission shaft 101. Power is delivered from the rear end of the transmission shaft to the traction wheels of the vehicle in any desired manner.

The operation of the apparatus is as follows:

Figures 2, 4 and 6 are sectional views looking toward the rear of the apparatus, and the directions of rotation of the various parts will be described with reference to such figures. The driving shaft 24 is connected to the motor vehicle engine and is driven thereby in a clockwise direction. The gear 25 is accordingly driven in a similar direction and meshes with the planetary gears 35 to transmit motion thereto according to the various conditions present. When the car is at rest and the synchronizing clutch elements 120 and 121 are disengaged, there is no torque reaction on the driven shaft 40, and it will become apparent that under such conditions, the springs 74 of the torque reaction device are extended to their full length to maintain each lug 73 in engagement with its corresponding lug 68. The clutch housing 51 and the housing 69 of the torque responsive device, under such conditions, occupy relative positions in which the lever lugs 79 will be arranged in the portions of the trackways 80 nearest the rear wall of the housing 51. The clutch elements 59 accordingly will be in full operative engagement.

When it is desired to start the vehicle, the gear shift lever 117 is properly manipulated to transmit forward movement from the fork 118 to the drum 123. Through the frictional engagement of the poppets 126 with the grooves 125, the forward movement of the drum 123 is transmitted to the synchronizing clutch element 120 until this element engages in the clutch recess 121, whereby the driven and transmission shafts will be synchronized to permit further forward movement of the drum 123 to move the grooves 125 into engagement with the positive clutch teeth 106. The rear ends of these clutch teeth and the forward ends of the grooves 125 are chamfered to facilitate engagement of the positive clutch elements.

The transmission shaft is positively connected to the traction wheels, and the engagement of the positive clutch elements connects the driven shaft 40 to the transmission shaft, thus transmitting a torque reaction to the driven shaft tending to hold it stationary under the starting conditions being considered. Prior to the engagement of the positive clutch elements, all of the elements of the transmission in the housing section 10 are free to rotate and accordingly will theoretically rotate as a unit with the driving pinion 25. Upon engagement of the positive clutch elements, however, automatic operation of the forward transmission unit takes place to transmit power smoothly from the driving shaft 24 to the traction wheels of the vehicle to place the vehicle in forward motion.

Upon the engagement of the positive clutch elements, rotation of the sun gear 43 immediately stops, whereupon the planetary gears 35 start to rotate bodily in a counter-clockwise direction around the sun gear, and since the planetary gears mesh with the internal ring gear 54, counter-clockwise rotation also will be imparted to such member. The same motion will be transmitted by the sun gear to the housing 53 and thence through the hub 64 to the ring 66 (see Figures 1 and 6). The counter-clockwise rotation of the ring 66 causes the lugs 68 carried thereby to move against the tension of the springs 74 and these springs will be progressively compressed to transmit a counter-clockwise rotational force to the lugs 73. These lugs are carried by the housing 69, and accordingly this housing promptly tends to move in a counter-clockwise direction, together with its hub 92. Referring to Figure 4, it will be noted that the hub 92 carries the cam faces 94 engaging the rollers 98, and counter-clockwise rotation of the hub 92 accordingly tends to move the high points of the cam faces in the direction of the rollers 98, thus causing these elements to bind between the cam faces and the ring 95. The latter element is fixed against rotation, and the operation referred to accordingly promptly stops reverse or counter-clockwise rotation of the movable elements of the overrunning clutch and the elements connected thereto.

Under the conditions referred to, the housing 69 will be fixed against rotation, but the housing 51 will have moved in a counter-clockwise direction with respect to the housing 69 due to the compressing of the springs 74 of the torque responsive device, in the manner previously described. Accordingly relative rotation takes place between the housing 69 and the cam operating levers 77, whereby the lugs 79 of the levers 77 are caused to move to the other ends of the trackways 80 promptly upon the generation of the torque reaction referred to. Thus it will be apparent that the clutch elements 59 are released, since the outward movement of the levers 77 and their adjustable screws 89 relieves the pressure on the pins 87 of the pressure plate 85. This action wholly releases the housing 51 for clockwise rotation, and also for counter-clockwise rotation within the limits of the compressibility of the springs 74, or the limit of movement defined by the arrangement of the lugs 90 in the openings 91. In this connection, attention is invited to the fact that under normal handling of the vehicle, the lugs 90 will not move to the extremities of the slots 91, since the releasing of the clutch plates 59 takes place before such limit of movement is reached. On the contrary, the normal operation of the vehicle with the accelerator depressed to a normal extent when the vehicle is started will be such that relative movement of the inner and outer elements of the torque responsive device will cease when the pressure of the springs 74 equals the torque reaction of the driven shaft 40. In other words, the springs 74 exert a force equal to the torque reaction of the driven shaft 40, at which point the clutch plates 59 will be completely disengaged.

At this step in the operation of the apparatus, the ring gear may be considered to be fixed against counter-clockwise rotation, although it will be cushioned against such rotation and thus acts to move to a reasonable extent if necessary to absorb torsional shocks through the springs 74. As the operator continues to depress the accelerator in starting the vehicle, the previous momentary counter-clockwise bodily movement of the planetary gears will stop due to the stopping of the ring gear, and they will then start to rotate bodily in a clockwise direction, the teeth of the gears 36 rolling around the ring gear and thus transmitting clockwise rotational force to the driven gear 43 in accordance with the usual operation of a planetary gear train. Such operation causes the driven shaft 40 to be rotated at a reduced or intermediate speed, and it will be apparent that the vehicle may be started in such intermediate speed under the majority of driving conditions.

As the vehicle speed increases and the vehicle gathers momentum, it will be apparent that the torque reaction on the shaft 40 progressively decreases. As previously stated, the torque reaction is balanced by the action of the springs 74, and as the torque reaction decreases upon an increase in vehicle speed the springs 74 expand in proportion to the decrease in torque reaction thus effecting relative rotation between the housing 69 and the clutch housing 53. This action causes the lugs 79 of the clutch operating levers 77 to move in the cam trackways 80 and after appreciable initial movement of the outer straight portions 82 of the trackways, the lever lugs 79 will move transversely with respect to the housing 69 through the trackway portions 84, thus progressively moving the levers 77 to exert a pressure on the clutch plates 59, and such pressure obviously will increase progressively in proportion to the decrease in the torque reaction on the shaft 40. This action takes place until the lever lugs 79 reach the trackway portions 83, at which point the clutch plates 59 will be in full driving engagement to lock the plate 46 to the clutch housing 53. Since the plate 46 carries the planetary gear spindles, it will be apparent that these spindles and the housing 53 will rotate as a unit, thus preventing rotation of the planetary gears on their own axes. Under such conditions, the planetary gears act as positive clutches between the driving pinion 25 and the driving gear 43, thus transmitting a direct drive from the shaft 24 to the shaft 40. The rotation of the clutch housing 53 under such conditions obviously takes place in a clockwise direction, and the lugs 68 of the torque responsive device engage the lugs 73 to rotate the housing 69. The overrunning clutch rollers 98 obviously permit clockwise rotation of the housing 69. All of the parts of the automatic transmission under such conditions rotate as a unit, thus providing a smooth balanced drive with the inertia of the rotating parts tending to smooth out the axial torque on the driven shaft 40.

Any slight torque reaction under normal driving conditions transmitted to the driven shaft 40 will react through the planetary pinions 36 to transmit a counter-clockwise impulse to the ring gear and such impulse will be transmitted in a relatively counter-clockwise direction to the torque responsive device, whereby the reverse torsional impulse will be absorbed by the springs 74. At the same time, the slight relative rotation caused under such conditions between the clutch housing 53 and the housing 69 will not affect the positive engagement of the clutch elements 59, since the lever lugs 79 are free to move within reasonable limits in the trackway portions 83 without swinging the clutch operating levers 77 about their pivots. In this connection, it will be noted that the trackway portions 82 also are parallel to the rear wall 52 of the clutch housing, and when the vehicle is initially gathering headway, any relatively minor torque reactions occurring through torsional vibration will not affect the clutch to tend to lock the plate 46 and housing 53 before the torque reaction has decreased to the proper point to permit clutch operation to start.

In a number of prior automatic transmissions, changes in driving ratio take place automatically by torque reaction, but the changes take place only at predetermined rotational speeds. In some constructions centrifugal clutches are employed which become operative and inoperative at predetermined speeds and the ratio may be controlled by the operator. With the present construction, attention is invited to the fact that the driving ratio automatically changes whenever there is sufficient torque reaction, the change taking place independently of rotational speeds. This automatic operation holds good for all operating conditions except when the lever ends 79 are arranged in the end portions of the trackways 80, these parallel end portions of the trackways being provided for the purpose previously described, namely, to absorb torsional vibrations without affecting the transmission ratio.

The foregoing description covers the conditions of operation existing when the vehicle is in intermediate gear, so to speak, and in high gear, namely, the conditions in which the clutch plates 59 are disengaged or completely engaged. It will be apparent that as the lever lugs 79 move out of the trackway portions 82 and start to move through the cam portions 84, there will be progressively increasing pressure exerted against the clutch plate as the torque reaction progressively diminishes due to the increased momentum of the vehicle. In the intermediate gear position with the clutch plates 59 wholly disengaged, the ring gear 54 and the parts connected thereto are stationary, except for slight relative movement incident to the absorption of torsional vibration by the springs 74, and under such conditions, all power is delivered from the shaft 24 to the driven shaft 40 through the bodily rotation of the planetary gears about the main driving axis. As the pressure on the clutch plates 59 progressively increases incident to the movement of the lever lugs 79 through the cam portions 84 of the trackways, frictional resistance is introduced to the rotation of the plate 46 with respect to the housing 53. A frictional driving force is thus transmitted to the housing 53, and such force is transmitted in a clockwise direction, in which direction the housing 53 is free to rotate through the operation of the overrunning clutch including the rollers 98. The driving force of the main shaft is then transmitted partly through bodily rotation of the planetary gears about the main axis and partly through the rotation of the planetary gears on their own spindles. This being the case, the speed ratio between the shafts 24 and 40 progressively changes to rotate the shaft 40 at higher speeds, and upon the continued movement of the lever 77 to apply increasing pressure on the clutch plates 59, incident to progressively decreasing torque reaction on the shaft 40, increasing frictional driving forces will be transmitted from the plate 46 to the housing 53. The clutch plates per se accordingly operate in accordance with conventional practice and accordingly operate to progressively increase the clockwise rotational speed of the housing 53 with respect to the plate 46. This progressive increase in speed of the housing 53 obviously results in the progressive decreasing of the rotational speed of the planetary gears about their spindles until the point of positive clutch engagement is reached. At this point, the highest transmission ratio is reached in the manner previously described, the planetary gears ceasing to rotate about their own axes, while the entire automatic transmission unit rotates about the main axis.

As previously stated, the present transmission permits the use of smaller engines of less power. Such smaller motor is capable of driving the vehicle in the high gear position described over level roads and over substantial grades without any changing in the transmission ratio, and when the vehicle is called upon to climb grades in excess of the grades which the smaller motor is adapted to climb in normal high gear condition, the present transmission operates automatically to change the transmission ratio to the desired extent. It further will become apparent that when a vehicle equipped with the present transmission is climbing at relatively low speeds a grade which the motor would be capable of climbing in high gear at higher speeds, the present transmission also functions to automatically change the transmission ratio.

Under either of the conditions described, the torque reaction on the shaft 40 increases to the point where it is materially greater than the tension of the springs 74 when the latter are in fully extended position, and under such conditions the increased torque reaction results in effecting relative rotation between the ring 66 and housing 69 in the same manner as when the vehicle is started from a standstill, except that the degree and rapidity of compression of the springs 74 will not be as great. The torque reaction under the conditions described, however, will be sufficient to move the lever lugs 79 from the trackway portions 83 into the adjacent trackway portions 84 a distance corresponding to the degree of torque reaction, thus causing the pressure on the clutch plates 59 to be decreased to permit relative rotation between the plate 46 and housing 51. Thus a proper transmission ratio will be automatically provided and the degree of change in the driving ratio will be proportionate to the increase in torque reaction acting through the shaft 40. After the vehicle passes over the top of the hill, the torque reaction on the shaft 40 will decrease to permit the springs 74 to restore the parts to normal position.

It will be apparent from the foregoing description that the forward transmission unit in the housing 10 affords two definite transmission ratios which may be termed intermediate and high gears, together with an infinite variation in ratio therebetween. The forward transmission unit is initially placed in operation through the simple expedient of performing one manual movement, namely, the single movement of the gearshift lever necessary for bringing the synchronizing clutch and the positive clutch of the rear transmission unit into operation. The rear transmission unit also provides two definite transmission ratios lower than the intermediate and high gear ratios described, together with an infinite variation between the two low gear ratios, although the two low gears need be used only rarely, as in the case of parking the vehicle or in an emergency.

The gears 107 and 109 are in constant mesh in accordance with conventional transmission operation. When the lowest gear ratio is desired, the gear shift lever is moved to effect forward movement of the shift rod 114 to bring the gears 110 and 112 into mesh, whereupon the drive is transmitted from the shaft 40 through gears 107 and 109 to the counter shaft 108 and thence to the shaft 101 through gears 110 and 112. A greatly reduced gear ratio is provided between the shafts 40 and 101, but the operation of the automatic unit of the transmission will be the same as in the previous case. In low gear operation, however, the low gear transmission between the shafts 24 and 40 will rotate the propeller shaft 101 at a very low speed, and a decrease in torque reaction transmitted to the shaft 40 through the counter shaft 108 and associated gearing results in rendering the clutch plates 59 operative to cause the forward transmission elements to rotate as a unit. This action provides a second low gear higher than the extremely low gear when the clutch plates 59 are released, but lower than the intermediate gear when the drive is transmitted directly from the shaft 40 to the shaft 101. Thus it will be apparent that the present invention provides four definite forward speeds with an infinite variation in ratio between the first and second speeds and the third and fourth speeds.

The apparatus also provides means whereby two reverse speeds may be utilized, and such operation need not be referred to in detail. Rearward movement of the gear 112 brings it into mesh with the conventional reverse gear which meshes with the gear 111, in which case the direction of rotation of the shaft 101 will be reversed. The automatic operation of the forward transmission unit, however, will be the same as in the conditions previously described, and accordingly two definite reverse gear ratios are provided with an infinite variation of gear ratio therebetween.

In practice, the gear 112 may be synchronized with the gears with which it meshes in the same manner that the shaft 101 is synchronized with the shaft 40 through the medium of the cone clutch elements 120 and 121. This is unnecessary however, since the gear ratios are low, and the torque reaction delivered to the shaft 40 when the vehicle is at a standstill very promptly releases the pressure on the clutch plates 59 in the manner previously described, and thus the stalling of the engine is prevented.

The foregoing description covers the functions of the automatic transmission during all conditions in which a driving torque is delivered from the shaft 24 to the traction wheels of the vehicle. It will be apparent that the torque responsive springs 74 function to provide a lower gear radio under normal driving conditions when the torque reaction increases to a predetermined extent. The springs 74 however serve a further additional purpose when the accelerator is released and the engine is employed as a brake. The result of such additional function is to minimize the use of the brakes when the vehicle speed is decelerated.

Referring to Figures 1 and 2, attention is invited to the previous description of the forward overrunning clutch embodying the rollers 32. This overrunning clutch is shown in detail in Figure 3, and it will be apparent that the clutch provides no function when the ring 26 is driven in a clockwise direction under the influence of the engine driving force. In other words, the flange 30, which forms a part of the plate 29, may rotate at the same speed as the driving shaft or at a lesser speed, but any inclination of the flange 30 to rotate in a clockwise direction at a greater speed than the ring 26 and the driving shaft will move the rollers 32 toward the high points of the cam faces 28, thus preventing the plate 29 and its flange 30 from rotating at a higher speed than the drive shaft 24.

Assuming that the vehicle is in normal operation with the automatic transmission in high gear position, the driver may release the accelerator pedal to use the engine as a brake. Under such conditions, there will be a prompt decleration in the speed of the driving shaft 24, and the momentum of the rotating parts of the automatic transmission tends to cause such parts to continue to rotate at the same speed, that is, at a relatively higher speed than the shaft 24. The overrunning clutch including the rollers 32 promptly functions to lock the plate 29 to the shaft 24 to prevent such relatively greater speed of the plate 29 and associated parts.

At this time, the momentum of the vehicle causes the shaft 40 to become the driving shaft, while the gear 43 becomes the driving gear and it will be noted that this gear rotates in a clockwise direction as viewed in Figure 2. Accordingly the gear 43 will rotate the pinions 36 and gears 35 counter-clockwise on their own axes at a higher speed than the pinion 25, which has been slowed down by the throttled engine. The tendency of the pinion 25 to retard rotation of the planetary gears reacts on the latter and the gears 35 will then momentarily rotate counter-clockwise about the axis of the pinion 25. This action, in turn, causes a driving force to be transmitted to the pinion 25 to unlock the forward overrunning clutch by causing the clockwise rotation of the pinion 25 to exceed the speed of rotation of the plate 29.

As the gears 35 momentarily rotate counter-clockwise about the pinion 25, the pinions 36 will also turn backward or counter-clockwise around the ring gear 54 and the reactionary force against the ring gear turns the latter element counter-clockwise against the tension of the springs 74. This action disengages the clutch plates 59 in the same manner as when the engine is delivering a driving torque to the traction wheels, and the plate 46 and associated elements will be disconnected from the housing 51, while the latter will become stationary within the limits of the compressibility of the springs 74 through the previously described operation of the overrunning clutch rollers 98. The ring gear obviously becomes stationary at the point where the reactionary counter-clockwise force exerted by the pinions 36 against the ring gear becomes equal to the force exerted by the springs 74 upon compression thereof. Under such conditions, the planetary gears will be rotating counter-clockwise around their own axes and will rotate bodily in a clockwise direction around the main axis at such speed as this pinion will be permitted by the resistance offered by the throttled engine. All of the parts of the apparatus then will be in the same condition as when in intermediate gear under normal driving conditions, and the engine will operate as a brake to retard the vehicle speed.

From the foregoing it will be apparent that the present invention is operative wholly automatically throughout the driving range of a vehicle and this eliminates the necessity and inefficiency of driver controlled gearshift. The selection of the gear ratio not only is taken entirely from the hands of the driver, but the interruption in the delivery or driving torque incident to the shifting of the conventional gears is wholly eliminated. Thus a constant driving torque is delivered and is automatically changed in accordance with varying driving conditions, including changes in torque reaction due to variations in pulling load, and variations in torque reaction due to the use of the vehicle engine as braking means. The present invention, however, retains the admitted practical features of the conventional type of gearing, such as its simplicity, low cost of production, compactness, high efficiency, silent operation and long life.

One of the advantages of the present transmission lies in the fact that it renders wholly practicable the use of an engine of smaller dimensions, thus effecting a material saving in the cost of vehicle manufacture, as well as a saving in fuel and oil to the operator. In this connection, attention is invited to the fact that when the automatic transmission is in direct drive, an engine of substantially smaller than the usual dimensions is wholly capable of taking care of most of the normal driving conditions which it is called upon to meet. Where additional torque is required as in pulling substantial grades, the torque reaction is utilized for changing the speed ratio in proportion to the additional pulling load imposed upon the engine, thus permitting the latter to deliver the same pulling torque as an engine of larger dimensions, and at the same time permitting the engine to operate more nearly at its speed of maximum efficiency.

In this connection, attention is invited to the usual practice of driving vehicles in which drivers attempt to pull all grades and all classes of loads in the high gear of conventional transmissions, and destructive strains are placed on the engine when the loads increase to the point where the engine is forced to operate at relatively low speeds. Under such conditions, therefore, the engine is forced to operate substantially below its speed of maximum efficiency. Such disadvantages are wholly eliminated with the present construction, and the driver is not called upon to exercise proper judgment in the selection of speed ratios.

It is the present practice to make the high gear ratio of conventional transmissions relatively large so that the vehicle engine has a surplus of power on level roads and sufficient power to pull substantial grades. This relatively large gear reduction is accompanied by two substantial disadvantages. In the first place, the surplus power for substantially level roads results in inefficient motor operation, while the driving of the vehicle at substantially top speeds results in operating the motor above its speed of maximum efficiency. The present invention not only permits a smaller engine to be employed, but it also permits the engine to operate closer to its speed of maximum efficiency under all normal driving conditions. Since the torque responsive means acts promptly and automatically under increased loads, it will be apparent that the engine is permitted to operate faster when pulling substantial grades since the torque reaction operates to change the gear ratio rather than to decelerate the engine to a speed at which it operates inefficiently.

As previously stated, the torque reaction operates in two directions with the present apparatus, and this fact provides one of the outstanding advantages of the apparatus. In the first place, the gear ratio changes whenever the relation between traction resistance and engine torque varies sufficiently in the forward propelling of the vehicle, and in the second place, the ratio is changed by the momentum of the vehicle when using the engine as a brake in descending grades or making quick stops. Thus an additional margin of safety is provided together with the instant and perfect control of the car, and the necessity for brake operation is reduced.

As previously stated, changes in gear ratio are effected automatically by torque reaction without the interruption of power, and the change takes place without shock to the mechanism involved. The apparatus is flexible and capable of absorbing shocks and jars due to the inherent characteristics of the torque responsive device. Moreover, the apparatus permits the use of a higher second or intermediate gear and is permitted to accelerate quickly with fast engagement of the clutch without shock to the mechanism or to the car.

Attention also is invited to the fact that the transmission operates as silently in the low gear ratio as in direct drive. This is accomplished through the silent meshing of the gear teeth under spring tension, and through the fact that the pinion drive is on the inside of the internal ring gear. Accordingly silent operation is provided regardless of high pitch-line velocities. Moreover, it will be apparent that all gears in the forward or automatic portion of the transmission may be of the constant mesh helical type to increase the degree of silence in operation. To prevent end thrust in either direction the teeth of the pinion 25 and the planetary gears 35 are set at an opposite angle to the teeth of the gear 43 and the ring gear 54. The use of gears of the type referred to, the spring tension on the gear teeth and the muffling of the ring gear through its housing provides exceedingly quiet intermediate gear operation without back lash, and it will be apparent that the construction is such that gear tooth contact takes place within an oil bath to increase the efficiency and quietness of operation.

While the apparatus has been illustrated as a complete transmission unit operable under all conditions and for all driving purposes, it will be apparent that the invention principally resides in the automatic transmission unit in the forward housing. Such automatic unit is not limited in its application to the specific transmission illustrated, but may be suitably employed in other ways to utilize torque reaction to provide the desired results. For example, the pinion 25 could be on the power take-off shaft of a conventional transmission with the shaft 40 forming the propeller shaft. Under such conditions, a vehicle with a conventional transmission would be provided with a transmission unit of the automatic type responsive to variations in torque reaction to provide an automatic intermediate gear with infinite gear ratios between such intermediate gear and direct drive rearwardly of the conventional transmission, thus rendering it unnecessary for a driver to shift from high into intermediate gear to take care of increased driving loads.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A transmission comprising a driving shaft, a driven shaft, transmission gearing connecting said shafts, a member rotatable in one direction when the torque reaction on said driven shaft is below a predetermined maximum, said gearing being operative for creating a reaction tending to rotate said member in the opposite direction upon an increase in the torque reaction of said driven shaft above said predetermined maximum, means for preventing substantial rotation of said member in said last named direction, spring means arranged between said member and said last named means for permitting limited rotation of said member in said last named direction, and means operative upon the generation of a reaction tending to rotate said member in said last named direction for increasing the transmission ratio through said gearing.

2. A transmission comprising a driving shaft, a driven shaft, transmission gearing connecting said shafts, a member rotatable in one direction when the torque reaction on said driven shaft is below a predetermined maximum, said gearing being operative for creating a reaction tending to rotate said member in the opposite direction upon an increase in the torque reaction of said driven shaft above said predetermined maximum, means for preventing substantial rotation of said member in said last named direction, compression spring means arranged between said member and said last named means and compressible upon the generation of a reaction tending to rotate said member in the last named direction when the torque reaction of said driven shaft is above said predetermined maximum, and means operative upon compression of said spring means for increasing the transmission ratio through said gearing.

3. A transmission comprising a driving shaft, a driven shaft, transmission gearing connecting said shafts, a member rotatable in one direction when the torque reaction on said driven shaft is below a predetermined maximum, said gearing being operative for creating a reaction tending to rotate said member in the opposite direction upon an increase in the torque reaction of said driven shaft above said predetermined maximum, means for preventing substantial rotation of said member in said last named direction, spring means arranged between said member and said last named means for permitting limited rotation of said member in said last named direction, a clutch operative for determining the minimum speed ratio between said shafts, and means operative upon the generation of a reaction tending to rotate said member in the last named direction for releasing said clutch to increase the transmission ratio through said gearing.

4. A transmission comprising a driving shaft, a driven shaft, transmission gearing connecting said shafts, a member rotatable in one direction when the torque reaction on said driven shaft is below a predetermined maximum, said gearing being operative for creating a reaction tending to rotate said member in the opposite direction upon an increase in the torque reaction of said driven shaft above said predetermined maximum, means for preventing substantial rotation of said member in said last named direction, compression spring means arranged between said member and said last named means and compressible upon the generation of a reaction tending to rotate said member in the last named direction when the torque reaction of said driven shaft is above said predetermined maximum, a clutch operative for determining the minimum speed ratio between said shafts, and means operative upon compression of said spring means for releasing said clutch to increase the speed ratio through said gearing.

5. A transmission comprising a driving shaft having a pinion thereon, a driven shaft having a gear thereon, a planetary gear and a planetary pinion fixed to each other and meshing respectively with said driving pinion and driven gear, a ring gear meshing with said planetary pinion, a rotary member having a spindle on which said planetary gear and pinion are rotatable, a supporting member for said ring gear rotatable in the same direction as said driven gear, means for limiting reverse rotation of said supporting member, means for fixing said supporting member with respect to said rotary member for rotation therewith in said first named direction when the torque reaction on said driven shaft is below a predetermined maximum, spring means connected between said supporting member and said limiting means and deflectable by reverse rotation of said supporting member upon the generation of a torque reaction on said driven shaft in excess of said predetermined maximum, and means operative upon a predetermined deflection of said spring means for releasing the means for fixing said supporting member with respect to said rotary member.

6. A transmission comprising a driving shaft having a pinion thereon, a driven shaft having a gear thereon, a planetary gear and a planetary pinion fixed to each other and meshing respectively with said driving pinion and driven gear, a ring gear meshing with said planetary pinion, a rotary member having a spindle on which said planetary gear and pinion are rotatable, a supporting member for said ring gear rotatable in the same direction as said driven gear, means for limiting reverse rotation of said supporting member, a clutch connected between said supporting member and said rotary member, means for rendering said clutch operative when the torque reaction of said driven shaft is below a predetermined maximum, and means for releasing said clutch when said torque reaction increases to a point in excess of said predetermined maximum.

7. A transmission comprising a driving shaft having a pinion thereon, a driven shaft having a gear thereon, a planetary gear and a planetary pinion fixed to each other and meshing respectively with said driving pinion and driven gear, a ring gear meshing with said planetary pinion, a rotary member having a spindle on which said planetary gear and pinion are rotatable, a supporting member for said ring gear rotatable in the same direction as said driven gear, means for limiting reverse rotation of said supporting member, a clutch connected between said supporting member and said rotary member, means for rendering said clutch operative for connecting said members when the torque reaction on said driven shaft is below a predetermined maximum, spring means arranged between said supporting member and said limiting means and deflectable upon the generation of a reverse reaction of said supporting means incident to the increase in the torque reaction of said driving shaft to a point in excess of said predetermined maximum, and means operative upon a predetermined deflection of said spring means for releasing said clutch.

8. A transmission comprising a driving shaft, a driven shaft, means for transmitting power between said shafts, said means including a member rotatable in one direction when the torque reaction of said driven shaft is below a predetermined maximum, a control member surrounding said driven shaft and rotatable in the same direction as said first named member, an overrunning clutch for preventing reverse rotation of said control member, spring means arranged between said members and deflectable upon reverse rotation of said first named member incident to the generation of a torque reaction on said driven shaft in excess of said maximum, and means operative upon deflection of said spring means for increasing the driving ratio between said driving shaft and said driven shaft.

9. A transmission comprising a driving shaft, a driven shaft, transmission gearing connecting said shafts, a member rotatable in one direction when the torque reaction on said driven shaft is below a predetermined maximum, said gearing being operative for creating a reaction tending to rotate said member in the opposite direction upon an increase in the torque reaction of said driven shaft above said predetermined maximum, a control member surrounding said driven shaft and rotatable in the same direction as said first named member, an overrunning clutch preventing reverse rotation of said control member, spring means cushioning reverse rotation of said first named member with respect to said control member, said spring means being deflectable upon a reverse rotation of said first named member when the torque reaction on said driven shaft is above said predetermined maximum, and means operative upon deflection of said spring means for increasing the transmission ratio through said gearing.

10. A transmission comprising a driving shaft having a pinion thereon, a driven shaft having a gear thereon, a pair of coaxial planetary gears meshing respectively with said pinion and said gear, a ring gear, the planetary gear which meshes with said driven gear being in mesh with said ring gear, a supporting member for said ring gear rotatable in the same direction as said driven gear, means for fixing said supporting member for rotation in said first named direction at the same speed as the axis of said planetary gear rotates about the axis of said driven shaft when the torque reaction on said driven shaft is below a predetermined maximum, a control member surrounding and rotatable in the same direction as said driven shaft, an overrunning clutch preventing reverse rotation of said control member, spring means arranged between said supporting member and said control member and deflectable upon the generation of a torque reaction on said driven shaft above said predetermined maximum and tending to rotate said supporting member in the opposite direction, and means operative upon deflection of said spring means for releasing the means for fixing said supporting member for rotation in said first named direction.

11. A transmission comprising a driving shaft having a pinion thereon, a driven shaft having a gear thereon, a planetary gear and a planetary pinion fixed to each other and meshing respectively with said driving pinion and driven gear, a ring gear meshing with said planetary pinion, a rotary member having a spindle on which said planetary gear and pinion are rotatable, a supporting member for said ring gear rotatable in the same direction as said driven gear, means for fixing said supporting member with respect to said rotary member for rotation therewith in the same direction as said driven gear when the torque reaction on said driven shaft is below a predetermined maximum, a control member surrounding and freely rotatable in the same direction as said driven shaft, an overrunning clutch preventing reverse rotation of said control member, spring means arranged between said supporting member and said control member and deflectable upon reverse rotation on said supporting member incident to the generation of a torque reaction on said driven shaft in excess of said predetermined maximum, and means operative upon predetermined deflection of said spring means for releasing said supporting member from said rotary member.

12. Apparatus constructed in accordance with claim 11 provided with means for preventing reverse rotation of said rotary member.

13. A transmission comprising a driving shaft having a pinion thereon, a driven shaft having a gear thereon, a planetary gear and a planetary pinion fixed to each other and meshing respectively with said driving pinion and said driven gear, a plate having a spindle on which said planetary gear and pinion are rotatable, an internal ring gear meshing with said planetary pinion, a supporting member carrying said ring gear and rotatable in the same direction as said driven shaft, a clutch arranged between said plate and said supporting member and operative for fixing said supporting member for rotation with said plate when the torque reaction on said driven shaft is below a predetermined maximum, a control member surrounding and rotatable in the same direction as said driven shaft, an overrunning clutch preventing reverse rotation of said control member, spring means arranged between said supporting member and said control member and deflectable upon reverse rotation of said supporting member incident to the generation of a torque reaction on said driven shaft in excess of said predetermined maximum, and means operative upon a predetermined deflection of said spring means for releasing said clutch.

14. Apparatus constructed in accordance with claim 13 provided with means for preventing reverse rotation of said plate.

FRANK C. REYNOLDS.